Aug. 18, 1953          D. G. IHRIG          2,649,565
BATTERY CHARGING CONTROL RESPONSIVE TO GAS PRESSURE
Filed Jan. 11, 1947
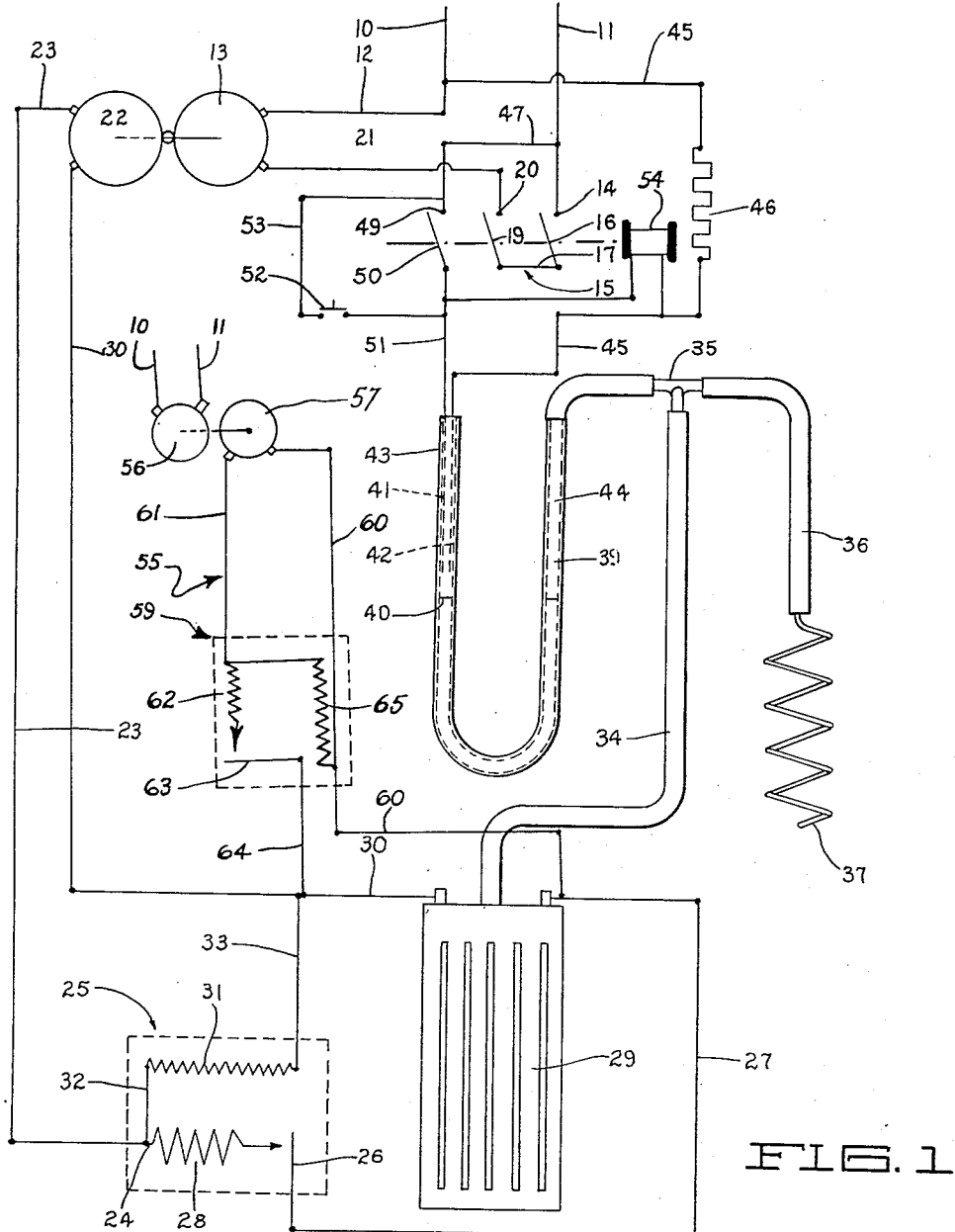
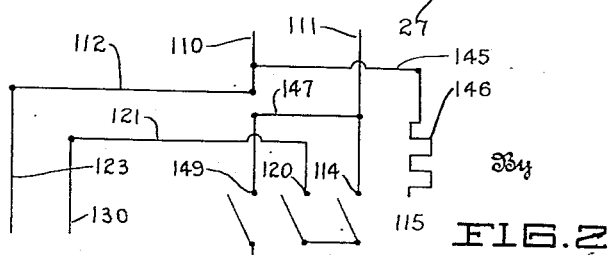
FIG.1
FIG.2
Inventor
DONALD G. IHRIG
By Robert M. Dunning
Attorney Patented Aug. 18, 1953

2,649,565

UNITED STATES PATENT OFFICE 2,649,565

BATTERY CHARGING CONTROL RESPONSIVE TO GAS PRESSURE

Donald G. Ihrig, Evanston, Ill.

Application January 11, 1947, Serial No. 721,541

6 Claims. (Cl. 320—31)

My invention relates to an improvement in battery charging control wherein it is desired to provide a means of discontinuing or modifying the charging operation when the battery has become fully charged.

Considerable difficulty has been experienced in providing a simple and effective control for terminating a battery charging operation or modifying the rate of charge when the battery becomes fully charged. Various methods have been used to accomplish the desired result. Circuit breaking means actuated by changes in the specific gravity of the battery fluid have been employed. Other circuit breaking devices have been produced which are actuated by changes in the battery charging current or voltage. The rate of change of the battery charging current or voltage is relatively great when the battery charge is low, but this rate of change decreases as the battery approaches full charge after which the voltage and current are static. As a result, charging circuit cut-off devices actuated by current or voltage changes must be extremely accurate and sensitive and must be actuated substantially before the battery reaches full charge with the incorporation of a time delay device prolonging the charging circuit for a predetermined period thereafter to make sure the battery is fully charged. As the charging time of batteries varies, both with the age and condition of the battery and with changes in charging conditions which are dependent upon the voltage, amperage and temperature, it is difficult to produce a predetermined time cut-off point and following interval sufficient to fully charge all batteries without overcharging others.

It is the object of the present invention to provide a simple and effective control for discontinuing or modifying the battery charge actuated by the gas given off by the battery during the charging operation. When the battery charge is low, the plates are highly receptive to charge. As a result, little gas is given off by the cell or cells being charged. However, as the battery becomes more fully charged, the resistance to charge increases, and electrolysis of water in the cell takes place. Hydrogen and oxygen are given off in increasing amounts. The amount of these gases given off by the battery during the charging operation increases as the battery approaches full charge and the rate of emission of gas continues to increase even after the battery has become fully charged. By the term "full charge" I mean that the cell has reached terminal charge voltage with constant current applied, as defined by "Storage Batteries" Third Edition, by Vinal, pages 236 to 239, paragraphs (a) and (b). This book was published in 1940 by John Wiley and Sons, Inc. Accordingly by providing a device actuated by changes in rate of the emitted gas, it is possible to produce an accurate control which will cut off the charging circuit after the battery becomes fully charged. In view of the fact that the rate of emission of gas from the battery increases up to and beyond fully charged condition of the battery, a readily measurable means of determining when the battery is fully charged is provided.

A feature of the present invention resides in the provision of a means for measuring the amount of gas given off by a battery as it is charged and of employing this measuring means for cutting off or modifying the charging circuit to the battery when the rate of gas emission reaches a predetermined point.

A further feature of the present invention resides in the provision of a gas venting means connected to the battery and of a means for measuring the rate of gas being vented. All of the gas emitted by the battery must pass through this venting means so that the rate at which the gas is being formed may be accurately measured.

An added feature of the present invention resides in the provision of a venting device connected to a battery and in restricting the outlet from this venting means so that variations in the rate of flow through the venting means may be measured. As the rate of formation of the gas increases a pressure is produced in the venting means due to the restricted vent outlet. Pressure actuated means is provided for controlling the battery charging circuit.

An additional feature of the present invention lies in the provision of a pressure actuated switch which is sensitive to slight variations in pressure and in using this switch for controlling the battery charging circuit. Thus when the rate formation of gas in the battery increases to a predetermined point, the switch contacts will be actuated, thereby modifying the charging circuit.

These and other objects and novel features of my invention will be more clearly and fully set forth in the following specification and claims.

In the drawing forming a part of my specification:

Figure 1 illustrates diagrammatically a battery charging circuit employing a pressure sensitive control actuated by variations in the rate of emission of gas from the battery.

Figure 2 is a diagrammatic view showing a modified portion of the circuit.

The charging circuit includes a pair of power supply lines 10 and 11. The conductor 10 is connected to the conductor 12 leading to one terminal of the motor 13. The conductor 11 is connected to one terminal 14 of the three bladed relay 15. The relay blade 16 of the relay 15 is connected by the conductor 17 to the switch blade 19 of the relay 15. When the relay 15 is in circuit closing position the blade 19 is connected to the relay terminal 20 connected by the conductor 21 to the other terminal of the motor 13. Thus when the relay 15 is in circuit closing position, a circuit is closed from the power supply lines 10 and 11 to the motor 12.

The motor 13 is connected through a suitable connector to the generator 22. One terminal of the generator 22 is connected by the conductor 23 to the terminal 24 of the generator cut-out relay 25. When the cut-out 25 is in circuit closing position the terminal 24 is connected to the contact 26 which is connected by the conductor 27 to one terminal of the storage cell battery 29. The other terminal of the generator 22 is connected by the conductor 30 to the remaining terminal of the battery 29. Thus when the generator cut-out 25 is in circuit closing position the battery charging current flows from the generator 22 through the battery 29. As is usual practice the cut-out relay 25 is provided with a coil 31, one terminal of which is connected by the conductor 32 to the battery charging current line 23, and the other terminal of which is connected by the conductor 33 to the battery charging current line 30. The coil 31 is actuated by generator voltage when this generator voltage exceeds the battery voltage. This actuation pulls the contact 26 closed. A circuit is then closed through the cut-out coil 28, maintaining this contact 26 in closed position. The coil 28 also bucks the coil 31 upon a reduction of the generator voltage, causing the contact 26 to move into open position to disconnect the battery 29 from the generator upon termination of the charge cycle.

The battery 29 is sealed to prevent the escape of gas therefrom and a vent tube 34 is provided connected to the top of the battery above the fluid level therein, through which the gas formed in the battery may flow. In the apparatus diagrammatically illustrated in Figure 1 the vent tube 34 is connected by a T connector 35 to a vent line 36 having a restricted outlet 37. Because of the relatively small amount of gas produced and because of the small differences in pressure involved, I prefer to employ an elongated tube of small internal diameter to provide the restriction in place of an orifice in the vent pipe. The flow of the gas through the elongated small diameter outlet tube 37 is the equivalent of an extremely small diameter orifice in the end of the vent tube, and is considerably easier to produce. The proper rate of escape of gas from the vent tube may be regulated by varying the length of the small diameter tube 37.

The T connector 35 is also connected to one end of a U-shaped tube 39 which contains mercury or some other suitable material as indicated at 40. The U-shaped tube 39 thus forms a manometer which measures variations in pressure in the vent tube by varying the levels of the mercury on opposite sides of the tube 39.

A pair of contacts 41 and 42 are positioned in the open end 43 of the U tube 39, these contacts being preferably adjustable in height. The lower ends of the contacts 41 and 42 are spaced somewhat above the level of the mercury when pressure on opposite sides of the tube 35 is equal. Thus as the pressure in the vent tube 34 increases the mercury is forced downwardly in the connected end 44 of the manometer 39 and rises in the open end 43 thereof until the ends of the contacts become immersed in the mercury. As soon as the mercury level in the tube end 43 electrically connects the contacts 41 and 42, a circuit is closed therebetween.

The power line conductor 10 is connected by a conductor 45 through a resistance 46 to the contact 42. The line wire 11 is connected by the conductor 47 to the switch terminal 49 of the relay 15. The relay blade 50 is engageable with the terminal 49 and when thus engaged connects the terminal 49 to a conductor 51 leading to the contact 41.

A starting button 52 is connected by the conductor 53 in parallel with the relay blade 50. An operating coil 54 for operating the relay 15 is connected between the conductor 51 and the conductor 45. Thus when either the starting button 52 or the relay blade 50 is in circuit closing position, a circuit is formed through the operating coil 54 and the resistance 46 to the line wires 10 and 11.

The operation of my battery charging control is believed obvious from the foregoing description. When the battery 29 is to be charged, the battery is connected in the circuit as illustrated and the vent tube 34 connected thereto to form the only gas outlet therefrom. The starting button 52 is actuated, closing the circuit from the line wire 11 through the conductors 47 and 53 to one terminal of the operating coil 54. The other terminal of the coil 54 is connected by the conductor 45 through the resistance 46 to the line wire 10. Energization of the coil 54 closes the relay 15, thus forming a circuit from the line wire 11 through the relay blades 16 and 19 and the conductor 21 to one terminal of the motor 13. The other terminal of this motor is connected by the conductor 12 to the line wire 10. Operation of the motor 13 actuates the generator 22 which is connected by conductors 23 and 30 and conductors 32 and 33 to the cut-out coil 31. As soon as the generator voltage exceeds the battery voltage, the coil 31 is thus energized, closing a circuit through the cut-out contact 26 from the generator 22 to one terminal of the battery, the other of which is connected by the conductor 30 to the other generator terminal. The generator 22 thus produces the battery charging current required to charge the storage cell 29.

As the cell 29 approaches fully charged position the gas produced by the charging operation increases in volume. As the outlet of the vent 34 is restricted a slight pressure is produced in the manometer 39, closing a circuit between the contacts 41 and 42. As soon as the mercury electrically connects the contacts 41 and 42, a circuit is formed by-passing the coil 54, de-energizing this coil. The circuit extends from the line wire 11 through the conductor 47, the terminal 49, relay blade 50, conductor 51, contacts 41, 42, conductor 45 and resistance 46 to the line wire 10. Upon de-energization of the relay 15, this relay will open, breaking the circuit from the power supply lines to the motor 13 and thus terminating the charging operation.

By proper adjustment of the elevation of the contacts 41 and 42, the charging circuit may be cut off at the time the battery 29 reaches full charge. As the development of gas during the charging operation is dependent upon the state of charge and charging current, an accurate control of the charging circuit is provided. I have found that the rate of emission of gas from the battery is virtually entirely dependent upon the condition of charge of the battery when the charging rate remains substantially constant. As a result my control will open or modify the battery charging circuit when the battery has reached full charge regardless of the condition of charge of the batteries at the start of the charging operation.

In the event a direct current power source is used to supply the charging current, the arrangement shown in Figure 2 may be employed. In this figure, numbers have been used which are one hundred greater than the numbers designating similar elements in Figure 1.

In Figure 2, the line wires 110 and 111 supply direct current capable of charging the battery. Line wire 110 is connected directly to conductor 123 leading through the cut-off switch to the battery. The line wire 111 is connected through the relay 115 to conductor 121 which is connected to conductor 130 leading to the remaining battery terminal. In other words, the arrangement of Figure 2 is identical to that of Figure 1 except that the alternating current supply conductors 12 and 21 extending to the generator driving motor 13 of Figure 1 are connected instead to the battery supply conductors 23 and 30 when direct current is provided at the source.

The closing of the circuit between contacts 41 and 42 may reduce the charge or otherwise modify the same rather than to break the charging current. In other words, the relay 15 may control a modifying circuit rather than discontinue the charge entirely. In such an event, the charging circuit described may supplement a second charging circuit to the battery illustrated in Figure 1 and designated in general by numeral 55, or a motor-generator such as 56, 57 (later described in detail) may be connected to constantly deliver a charging current which is supplemented or augmented when the relay 15 is closed. The reduction or discontinuance of the charging current when the battery is fully charged has the added advantage of reducing the water consumption of the battery. In dealing with lead-acid batteries, profuse gassing caused by overcharging tends to wash active material from the plates. Thus the mechanical effect of the gassing is particularly disadvantageous in charging lead-acid batteries.

The second charging circuit 55 is parallel to, and may be identical with, the previously described circuit but omitting the relay 15. The circuit 55 is thus operating at a relatively low charging rate while the first described charging circuit is open. The line wires 10 and 11 are connected to the motor 56 which drives the generator 57 continuously. The generator is connected through the generator cut-out relay 59. One conductor 60 connects the generator with one terminal of the battery 29 being charged. A second conductor 61 extends from the generator 57 to the relay terminal 62. In circuit closing position the terminal 62 is connected to contact 63 connected by conductor 64 to the battery 29. A relay coil 65 is connected between conductors 60 and 61 and closes the relay circuit when the generator voltage exceeds the battery voltage.

My control system may serve as a protective measure to prevent injury to such batteries by acting to discontinue or modify the charge as soon as gas is emitted at a predetermined rate.

In accordance with the patent statutes, I have described the principles of construction and operation of my battery charging control, and while I have endeavored to set forth the best embodiment thereof, I desire to have it understood that obvious changes may be made within the scope of the following claims without departing from the spirit of my invention.

I claim:

1. A control system for charging a battery from a source of charging current, comprising electromagnetic means for connecting a battery to be charged to said source, means for energizing said electromagnetic means, and means responsive to the rate of generation of gas in the battery during charging operations and arranged to permanently demagnetize said electromagnetic means subject to manual resetting, said last named means including an elongated tubular restriction adapted to be connected to said battery for affording a restricted passage to atmosphere of the gas evolved incident to the charging of the battery.

2. A battery charging system including a battery, a charging circuit including means for supplying charging voltage to said battery, circuit interrupting means in said circuit, a T connection in communication with said battery, an elongated vent tube of restricted size connected to said T connection for conducting gases formed within the battery to the atmosphere and frictionally resisting gas flow therethrough, a pressure sensitive device for measuring variations in pressure in said vent connected to said T connection, and means actuated by said pressure sensitive means for controlling said voltage supplying means.

3. A battery charging system including a battery, a charging circuit including means supplying charging voltage thereto, circuit interrupting means in said circuit capable of permanently interrupting the circuit pending manual resetting thereof, an elongated vent tube connected to said battery to conduct gases formed within said battery to atmosphere and frictionally resisting gas flow therethrough, a manometer connected to said vent tube for measuring variations in pressure therein, and means actuated by variations in level in said manometer for actuating said circuit interrupting means.

4. A battery charging system including a battery, a charging circuit including means supplying charging voltage thereto, circuit interrupting means in said circuit capable of permanently interrupting the circuit pending manual resetting thereof, an elongated vent tube connected to said battery to conduct gases formed within said battery to atmosphere and frictionally restricting gas flow therethrough, a manometer connected to said vent tube, a pair of contacts extending into said manometer and electrically connected and disconnected by changes in pressure in said vent tube, and means actuated by said contacts for operating said circuit interrupting means.

5. A battery charging system including a battery, a charging circuit including means supplying charging voltage thereto, electrically operable circuit interrupting means in said circuit capable of permanently interrupting the circuit pending manual resetting thereof, an elongated vent tube connected to said battery to conduct gases formed within said battery to atmosphere and frictionally restricting gas flow therethrough, pressure actuated means actuated by variations in pressure in said vent, a pair of contacts electrically connected and disconnected by said pressure actuated means, and a circuit to said circuit interrupting means including a source of power supply and said contacts.

6. A battery charging system including a battery, means including a charging circuit supplying charging voltage thereto, circuit interrupting means in said circuit capable of permanently interrupting the circuit pending manual resetting thereof, an elongated vent tube connected to said battery to conduct and frictionally resist the flow of gases formed within said battery to atmosphere, a passage of restricted size through said vent, means actuated by variations of pressure in said vent, and means actuated by said pressure actuated means for operating said circuit interrupting means.

DONALD G. IHRIG.

References Cited in the file of this patent

UNITED STATES PATENTS

| Number | Name | Date |
| --- | --- | --- |
| 371,893 | King | Oct. 18, 1887 |
| 382,112 | Sellon | May 1, 1888 |
| 550,242 | Biddle | Nov. 26, 1895 |
| 821,672 | Richards | May 29, 1908 |
| 989,347 | Goldstein | Apr. 11, 1911 |
| 1,034,108 | Halbleib | July 30, 1912 |
| 1,087,289 | Halbleib | Feb. 17, 1914 |
| 1,152,822 | Lanphier et al. | Sept. 7, 1915 |
| 1,526,217 | James et al. | Feb. 10, 1925 |
| 1,605,020 | Woodbridge | Nov. 2, 1926 |